(12) United States Patent
Shnitko et al.

(10) Patent No.: US 8,296,292 B2
(45) Date of Patent: Oct. 23, 2012

(54) INTERNAL RANKING MODEL REPRESENTATION SCHEMA

(75) Inventors: Yauhen Shnitko, Redmond, WA (US); Dmitriy Meyerzon, Bellevue, WA (US); Vladimir V. Tankovich, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 349 days.

(21) Appl. No.: 12/625,558

(22) Filed: Nov. 25, 2009

(65) Prior Publication Data

US 2011/0125732 A1  May 26, 2011

(51) Int. Cl.
*G06F 17/30* (2006.01)
(52) U.S. Cl. ......... 707/723; 707/748; 707/752; 707/753
(58) Field of Classification Search .................. 707/723, 707/748, 752, 753
See application file for complete search history.

(56) References Cited

U.S. PATENT DOCUMENTS

| | | | |
|---|---|---|---|
| 6,601,075 B1* | 7/2003 | Huang et al. ................. | 707/748 |
| 7,188,117 B2* | 3/2007 | Farahat et al. ................ | 707/688 |
| 7,743,050 B1* | 6/2010 | Bem et al. ..................... | 707/713 |
| 7,788,195 B1* | 8/2010 | Subramanian et al. ......... | 706/20 |
| 8,121,970 B1* | 2/2012 | Tung et al. ..................... | 706/47 |
| 2008/0109209 A1* | 5/2008 | Fraser et al. ..................... | 704/4 |
| 2008/0294620 A1 | 11/2008 | Churin et al. | |
| 2009/0006356 A1 | 1/2009 | Liao et al. | |
| 2009/0024607 A1 | 1/2009 | Sun et al. | |
| 2009/0043615 A1* | 2/2009 | Belhe et al. ........................ | 705/4 |
| 2009/0157649 A1* | 6/2009 | Papadakis et al. ................ | 707/5 |
| 2009/0198669 A1 | 8/2009 | Shaw et al. | |
| 2009/0319508 A1* | 12/2009 | Yih et al. .......................... | 707/5 |
| 2010/0153315 A1* | 6/2010 | Gao et al. ........................ | 706/12 |
| 2010/0169323 A1* | 7/2010 | Liu et al. ....................... | 707/748 |
| 2010/0185623 A1* | 7/2010 | Lu et al. ....................... | 707/748 |

OTHER PUBLICATIONS

Weigel, et al., "Content and Structure in Indexing and Ranking XML", Retrieved at <<http://webdb2004.cs.columbia.edu/papers/5-2.pdf>>, Proceedings of the 7th International Workshop on the Web and Databases: colocated with ACM SIGMOD/PODS 2004, Jun. 17-18, 2004.

Rajapaksha, et al., "Internal Structure and Semantic Web Link Structure Based Ontology Ranking—Published Date: Dec. 12-14, 2008", Retrieved at <<http://ieeexplore.ieee.org/xpl/freeabs_all.jsp?arnumber=4783937>>, Information and Automation for Sustainability, 2008. ICIAFS 2008. 4th International Conference, Dec 12-14, 2008.

Fan, et al., "Discovery of Context-Specific Ranking Functions for Effective Information", Retrieval Using Genetic Programming, Retrieved at <<http://filebox.vt.edu/users/wfan/paper/AR-RANGER/tkde_2004.pdf>>, IEEE Transactions on Knowledge and Data Engineering, vol. 16, Issue 4, Apr. 2004.

Fan, et al., "A Generic Ranking Function Discovery Framework by Genetic Programming for Information Retrieval", Retrieved at <<http://filebox.vt.edu/users/wfan/paper/ARRANGER/ip&m2003.pdf>>, Information Processing and Management: an International Journal, vol. 40, Issue 4, May 2004.

* cited by examiner

*Primary Examiner* — Frantz Coby
(74) *Attorney, Agent, or Firm* — Turk IP Law, LLC

(57) ABSTRACT

A markup language schema utilized to represent internal ranking models. In one implementation, the schema developed utilizes XML (extensible markup language) for internal ranking model representation. Other markups languages can be employed.

19 Claims, 6 Drawing Sheets

INTERNAL RANKING MODEL REPRESENTATION SCHEMA

BACKGROUND

Typically, a search engine utilizes a ranking function to predict the degree of relevance of a document to a particular query. The ranking function takes multiple features from the document as inputs and computes a value that allows the search engine to sort the documents by predicted relevance. However, current representations of such functions are complex and problematic.

SUMMARY

The following presents a simplified summary in order to provide a basic understanding of some novel embodiments described herein. This summary is not an extensive overview, and it is not intended to identify key/critical elements or to delineate the scope thereof. Its sole purpose is to present some concepts in a simplified form as a prelude to the more detailed description that is presented later.

The disclosed architecture supports multiple ranking models of a search engine by storing ranking model configuration and parameters using a pre-defined format. The architecture employs a markup language schema to represent internal ranking models. In one implementation, the schema developed utilizes XML (extensible markup language) for internal ranking model representation. Other markups languages can be employed.

To the accomplishment of the foregoing and related ends, certain illustrative aspects are described herein in connection with the following description and the annexed drawings. These aspects are indicative of the various ways in which the principles disclosed herein can be practiced and all aspects and equivalents thereof are intended to be within the scope of the claimed subject matter. Other advantages and novel features will become apparent from the following detailed description when considered in conjunction with the drawings.

DETAILED DESCRIPTION

Figure 1:
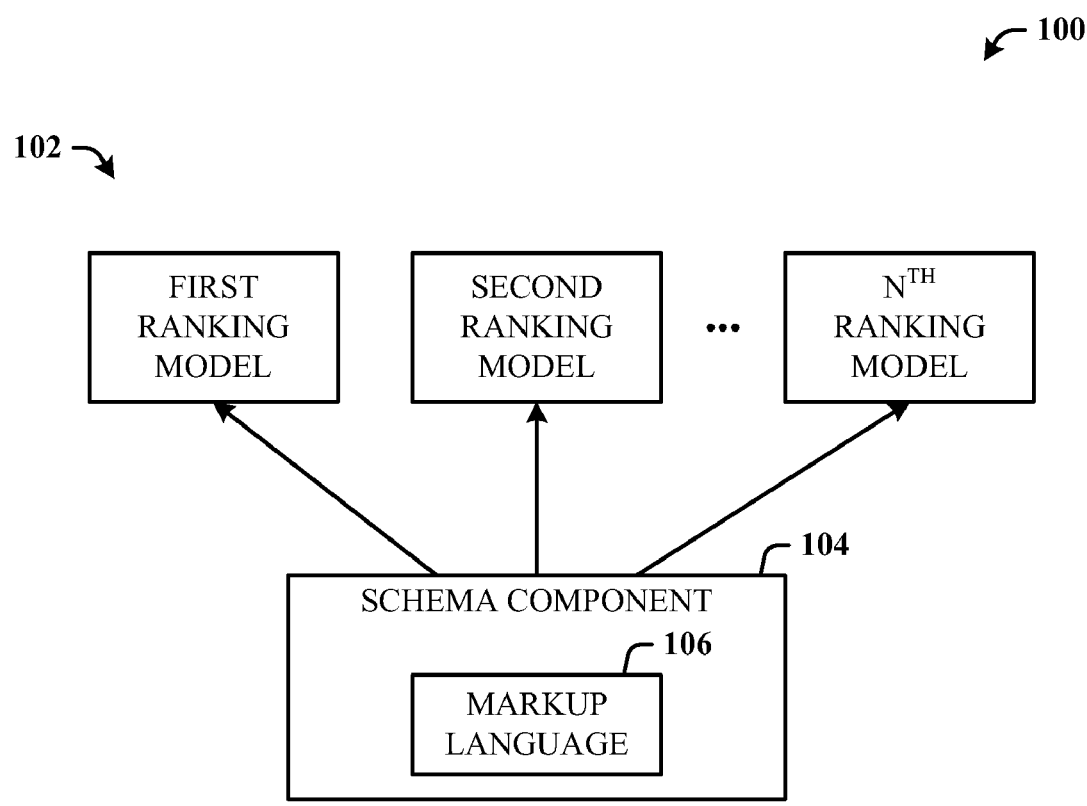
FIG. 1 illustrates a computer-implemented document ranking system in accordance with the disclosed architecture.

To support multiple ranking models, a search engine should store ranking model configurations and parameters using a pre-defined format. The disclosed architecture employs a markup language schema to represent internal ranking models. In one implementation, the schema developed utilizes XML (extensible markup language) for internal ranking model representation. However, it is to be understood that other markups languages can be employed. One of the ranking models can be a neural network; however, this is just one example of mathematical or computational models that can be employed for the relevance and rank processing.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well known structures and devices are shown in block diagram form in order to facilitate a description thereof. The intention is to cover all modifications, equivalents, and alternatives falling within the spirit and scope of the claimed subject matter.

FIG. 1 illustrates a computer-implemented document ranking system 100 in accordance with the disclosed architecture. The system 100 includes multiple ranking models 102 for ranking documents of a search in multiple stages, and a schema component 104 that represents the ranking models 102 in a predefined markup language 106. The markup language can be extensible markup language (XML). The multiple ranking models are internal to a search engine. The ranking models 102 can include a linear model followed by a neural network model of multiple stages.

Figure 2:
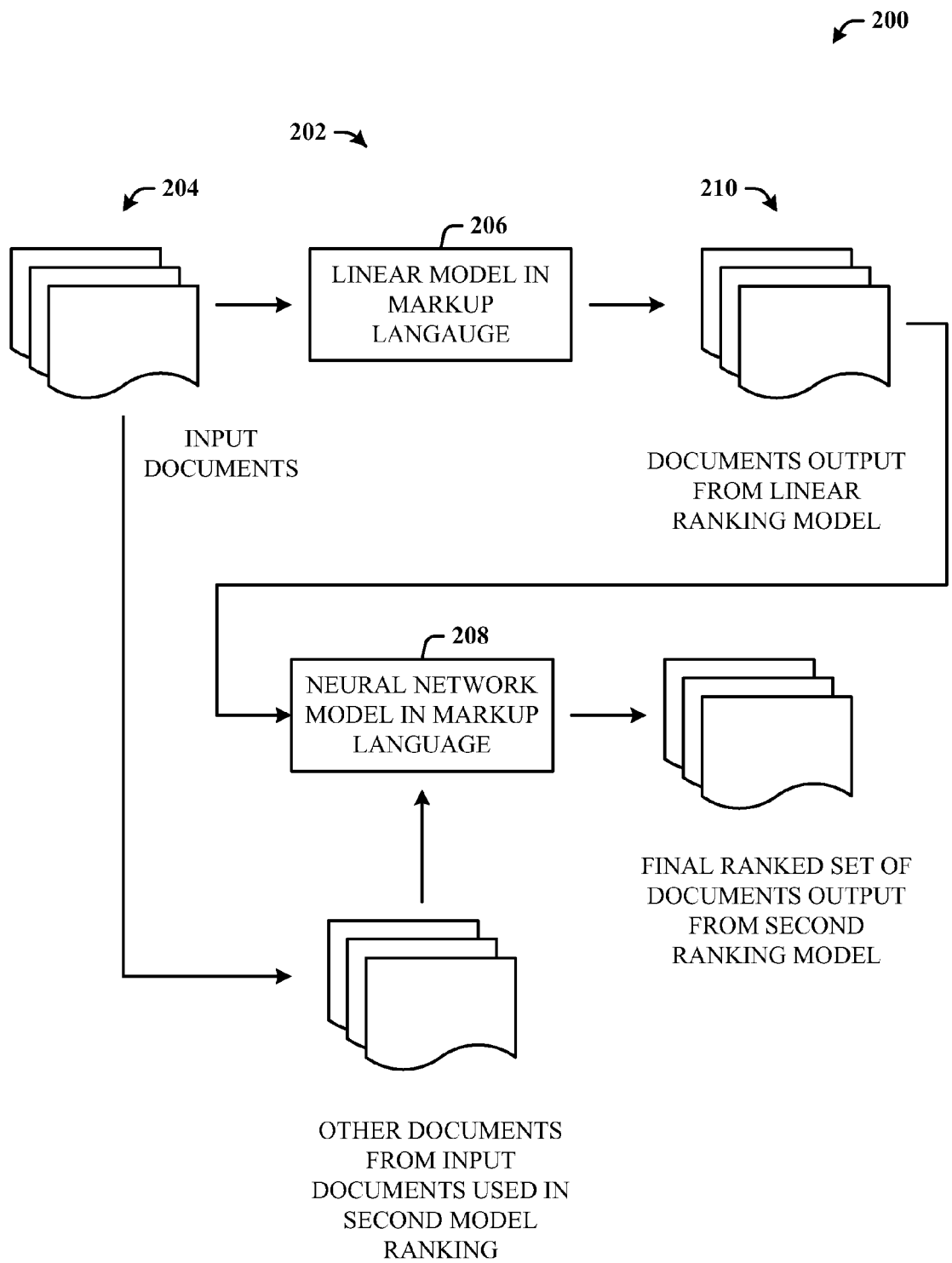
FIG. 2 illustrates a system of multiple ranking models for processing search documents.

FIG. 2 illustrates a system 200 of multiple ranking models 202 for processing search documents 204. The search documents 204 are first passed into a linear ranking model 206 represented in a markup language (e.g., XML). Candidate documents output from the linear ranking model 206 (selected according to ranking criteria imposed in the linear ranking model 206) are then passed into the neural network ranking model 208 for final document ranking using the candidate documents and other documents.

A high ranking document ranked in the first ranking model (e.g., the linear model 206) is boosted in rank for re-ranking with documents of the second ranking model (e.g., the neural network model 208). Put another way, a set of highest ranking documents of the first ranking model are used in re-ranking documents of the second ranking model. As one example of features employed in the document ranking, a ranking model includes a ranking feature that calculates social distance which boosts ranking weight of candidate results based on colleague relationships to a person issuing a query. Another example is a proximity ranking feature that is too expensive to compute in the first stage, since it requires more computation when going through positional information in the index.

Put another way, the computer-implemented document ranking system 200 comprises multiple ranking models 202 for ranking documents 204 of a search in multiple stages, and the schema component 104 that represents the ranking models 202 in the XML schema. The multiple ranking models 202 are internal and include the linear model represented in XML and the neural network model 208 represented in XML. The multiple ranking models 202 include the neural network model of multiple layers. As illustrated, the ranking models 202 include the linear model 206 followed by the neural network model 208. The set of documents ranked in a first model is re-ranked with documents in the second model 208. With respect to the neural network model 208, the XML schema defines hidden nodes and weighting for the neural network-based ranking model 208.

The candidate documents 210 (documents output from the first ranking model) resulting from ranking of the linear ranking model 206 are passed into the neural network model 208. The neural network model 208 further receives additional ranking features from the top documents returned by the first stage and re-computes the scores. The candidate documents 210 are re-ranked with these documents in this model 208 to output the final set of ranked documents.

The following description is one example of a schema that can be employed in multiple ranking model search engines. This exemplary representation uses the XML (extensible markup language).

The XML namespace of each element in a ranking model is in the form of "urn:Company.Search.Ranking.Model.2NN".

RankingModel2Stage element is a root element of an internal ranking model.

| Attribute | Mandatory | Meaning |
|---|---|---|
| id | required | unique model id |
| Child Element | Cardinality | Meaning |
| RankingModel2NN | 1 ... 2 | Ranking model for one stage - first element is for the first stage, second element is for the second stage. |

The final rank of a document across multiple ranking models is computed as follows. If a document is ranked by $1^{st}$ stage model, then rank=Model_Rank/2; if the document is then ranked by the $2^{nd}$ stage model, the rank=Model_Rank/2+500000.

In a linear model, Model_Rank=1000000*(score−MinScore), where MinScore is the minimal possible score for this linear model according to its parameters. In the NN (neural network) model, Model_Rank=1000000*(score+MaxAbsScore); MaxAbsScore=Sum(Abs(Layer2Weight[i])), where I=0 ... HiddenNodes-1.

The child element of the above root element RankingModel2Stage, is RankingModel2NN element. The RankingModel2NN element contains ranking model parameters for one stage.

| Attribute | Mandatory | Meaning |
|---|---|---|
| maxStageWidCount | Optional | Number of documents to re-rank at 2nd stage. maxStageWidCount documents are selected from documents ranked at 1st stage that have highest rank. |
| id | Required | Unique model id; is different for different RankingModel2NN elements. |
| Child Element | Cardinality | Meaning |
| HiddenNodes | 1 | Number of hidden nodes and second layer parameters of the NN. Some parameters are ignored if number of hidden nodes is one, but are presented, as specified in other sections. |
| RankingFeatures | 1 | Contains list of all ranking features participating in retrieving filtered set and rank computation. |

The score at the stage when the hidden nodes (HiddenNodes) count is one (linear model) is computed using the following formula:

$$Score=HN_0; \text{ where } HN_0=\Sigma_F HNAdd_0(F)$$

If the hidden nodes count is greater than one, the following formula is used:

$$Score=\Sigma_{i=0}^{N-1}(\text{Tan } h(HN_i+T_i) \cdot W2_i), \text{ where } HN_i=\Sigma_F HNAdd_i(F), \text{ and}$$

where, N is the number of hidden nodes specified in NiddenNodes/@count attribute, Tan h is the hyperbolic tangent, HNAdd(F) is the vector of hidden nodes additions produced by ranking feature F, T is the threshold vector specified in HiddenNodes/Thresholds element, W2 is the weight vector for the 2nd layer specified in the HiddenNodes/Layer2Weights element, and F is each ranking feature specified under RankingFeatures element, With respect to the HiddenNodes element, this element is the number of hidden nodes and second layer parameters of the neural net (NN).

| Attribute | Mandatory | Meaning |
|---|---|---|
| count | required | Number of hidden nodes in the model; allowed values are [1 ... 8]; linear model is defined with count equal to one. |
| Child Element | Cardinality | Meaning |
| Thresholds | 1 | Threshold vector. |
| Layer2Weights | 1 | 2nd layer weight vector. |

The RankingFeatures element includes the ranking features. Following is a list of ranking features that can be employed.

| Child Element | Cardinality | Meaning |
|---|---|---|
| BM25Main | 1 | Parameters for query dependent rank; is the first child element; order of other child elements is arbitrary. |
| BucketedStatic | 0 ... * | Parameters for static feature with small enumerable possible values (feature like FileType) |
| Static | 0 ... * | Parameters for query independent rank. |
| Language | 0 ... * | Parameters for special case of bucketed static feature -query language matching. |
| MinSpan | 0 ... * | Parameters for proximity minimal span feature. |
| StreamLength | 0 ... * | Parameters for stream length feature, aka property length, aka document length. |
| TAUC | 0 ... * | Parameters for original TAUC (title, anchor text, URL, and clicks) feature. |
| SocialDistance | 0 ... * | Parameters for SocialDistance feature. SocialDistance is a ranking feature that boosts ranking weight of candidate results based on colleague relationships to the person issuing the query. |

The BM25Main element is a ranking feature that includes the following attributes and child elements.

| Attribute | Mandatory | Meaning |
|---|---|---|
| k1 | Required | k1 parameter in BM25G formula. |
| Child Element | Cardinality | Meaning |
| Normalize | 1 | Normalization constants pre-computed at training time. |
| Layer1Weights | 1 | Vector of weights. |
| Properties | 1 | List of properties. |

This BM25Main element ranking feature produces the hidden node additions using the following formula:

$$HNAdd = \frac{\left(\left(\sum_{t \in Q} \frac{TF'_t}{k_1 + TF'_t} \cdot \log\left(\frac{N}{n_t}\right)\right) - M\right)}{S} \cdot W$$

$$TF'_t = \left(\sum_{p \in D} TF_{t,p} \cdot w_p \cdot \frac{1 + b_p}{\left(\frac{DL_p}{AVDL_p} + b_p\right)}\right)$$

where, $TF_{t,p}$ is the term frequency, $DL_p$ is the length of the property p (number of terms), $AVDL_p$ is the average length of the property p, N (the capitalized N) is the number of documents in the corpus, $n_t$ is the number of documents containing the given query term t, $k_1$, $w_p$, $b_p$ are parameters, M and S are the mean and standard deviation of the BM25G value based on the training set specified in the Normalize element, and W is the weight vector specified in the Layer1Weights element.

The Properties element of the BM25Main element can include the following list of document textual properties. For the document to be found, the following are true: every query term appears in at least one property, and at least one term appears in the main index property. The properties can include, but are not limited to, title, body, anchor, generated title, author, display name (last segment of URL path), QLogClickText (query for which the document was clicked), and SocialTag, for example.

| Child Element | Cardinality | Meaning |
| --- | --- | --- |
| Property | 1 ... * | Document property, aka stream participating in recall (for first stage only) and BM25G rank |

The above child Property element can include the following attributes.

| Attribute | Mandatory | Meaning |
| --- | --- | --- |
| pid | required | Managed property id. |
| w | required | weight |
| b | required | length normalization |
| extractOccurrence | optional default = 0 | Occurrence information can be extracted while computing the BM25 score. This information is used by proximity features. |
| inanchor | optional default = 0 | One, if the property is to be looked up in the anchor index (versus the main index) |

The BucketedStatic element of the above RankingFeature element can include the following attributes and child elements. A FileType feature may be used as BucketedStatic, because documents can fall exclusively on one and only one of the file types. Note that FileType is one example of a feature that can be used as BucketedStatic.

| Attribute | Mandatory | Meaning |
| --- | --- | --- |
| pid | required | Managed property id, defining static storage where raw feature value is taken from. |
| default | required | Default value used when storage is not available. |

| Child Element | Cardinality | Meaning |
| --- | --- | --- |
| Bucket | 1 ... * | Vector with additions for each possible raw feature value. |

HNAdd(x)=vector specified in Bucket[@value=x] element

The Bucket element, child element to the BucketedStatic element, can have the following attribute(s).

| Attribute | Mandatory | Meaning |
| --- | --- | --- |
| value | required | raw feature value |

| Child Element | Cardinality | Meaning |
| --- | --- | --- |
| HiddenNodesAdds | 1 | vector with additions |

The child element (HiddenNodesAdds) from above can further have the child element Add.

| Child Element | Cardinality | Meaning |
| --- | --- | --- |
| Add | HiddenNodes/@count | addition to one hidden node |

The Static element ranking feature can include the following attributes and child elements.

| Attribute | Mandatory | Meaning |
| --- | --- | --- |
| pid | required | Managed property id, defines static storage where raw feature value is taken from. |
| default | required | Default value used when storage is not available. |

| Child Element | Cardinality | Meaning |
| --- | --- | --- |
| Transform | 1 | Type and parameters of transform function. |
| Normalize | 1 | Normalization constants pre-computed at training time |
| Layer1Weights | 1 | Vector of 1st layer weights for this feature. |
| PrecomputeForRange | 0 ... 1 | Optimization parameters; does not affect rank |

The formula for calculating the hidden node additions is the following:

$$HNAdd(x) = \frac{(\text{Transform}(x) - M)}{S} \cdot W$$

where Transform is a transform function specified in the Transform child element, M and S are the mean and standard deviation of the feature value, respectively, specified in the Normalize child element, and W is the weight vector specified in the Layer1 Weights child element.

The Language element, child to the RankingFeatures element, includes parameters for the feature that is a special case of bucketed static feature with only two buckets—zero and one. The elements and child attributes are the same as for the BucketedStatic element. That is, pid is a property id which contains an LCID (locale ID) one per document. LCID is the locale identifier, which is a number that represents a language/region/sort combination that can be associated with date, time, number, currency and other formatting, calendar preferences, input methods, sorting preferences, and more. The Bucket is one if the primary language of the query is equal to the primary language of stored the LCID, or if the LCID is neutral; otherwise, the Bucket is zero. An exception is with respect to Chinese, where Chinese Simplified and Chinese Traditional are treated as separate primary languages for the LCID. If no static storage is available for the specified pid, then the bucket is as specified in the default attribute.

The SocialDistance element is a child element to the RankingFeatures element. The SocialDistance element includes parameters for the feature that boosts ranking weight of candidate results based on colleague relationships to the person issuing the query. The SocialDistance feature is a special case of the BucketedStatic feature with only three buckets—zero, one, and two. Each candidate result is grouped into one of these three buckets. The 0-bucket is for results that have no colleague relationship with the searcher. The 1-bucket is for results that are first level (direct) colleagues of the searcher. The 2-bucket is for results that are second level (in-direct) colleagues of the searcher.

The MinSpan element is a child element to the RankingFeatures element, and includes parameters for the MinSpan feature for a stream. The MinSpan feature returns the highest score of a span in a stream. The span is shorter than maxMinSpan to be considered.

Several instances of MinSpan element can be present in the model, having one or more different parameters that define the behavior of ranking feature. Pid identifies the part of the document the feature processes. Currently pid=1 if feature processes the document Body, and pid=2 if the document Title is being processed.

The FeatureValue can be computed using two different algorithms. If isExact equals 0, then an algorithm is used to find the shortest span which contains the highest number of distinct query terms. The length of the span is limited by the maxMinSpan parameter.

$$FeatureValue=((Unique\_diff\_terms\_in\_span/num\_query\_Terms)^4)*((Unique\_diff\_terms\_in\_span/span\_length)^0.33)$$

If isDiscounted=1, the ratio BestSpanRatio=BestNum/RarestTermCount is calculated, where BestNum is the number of shortest spans with the highest number of distinct query terms, and RarestTermCount is the number of instances of the rarest query term in the stream. The feature value is then multiplied by the BestSpanRatio.

Finally, neural network node additions are computed:

$$HNAdd(x) = \frac{(Transform\ (x) - M)}{S} \cdot W$$

where, x is FeatureValue, Transform is a transform function specified in the Transform element, M and S are the mean and standard deviation, respectively, specified in the Normalize element, and W is the weight vector specified in the Layer1 Weights element.

If isExact=1, FeatureValue is a rational number that belongs to [0 . . . 1], and is computed for a "stream" of a document, defined by pid. Each time a FeatureValue is assigned, it is returned immediately and no further calculations are made.

1) if a single term query, then FeatureValue=default;

2) if a document contains less than two query terms, FeatureValue=0;

3) each query term is assigned a number k that is equal to the position of this term in the query, the position ranging from 0 to N−1, where N is the number of query terms.

4) CurrentBest is initialized to 1; BestMatch=1, and BestNum=0.

Instances of query terms in the document stream are processed sequentially, starting from the second instance of the query term. In one implementation, only information about query terms in the document stream is read from the index.

For each instance of a query, a check can be made if a previous instance of a query term immediately precedes the current instance in the document stream and the corresponding k for the current term is greater than or equal to k for the preceding term.

If greater than or equal to k, then ++CurrentBest; otherwise, CurrentBest=1.

If CurrentBest>BestMatch, then BestMatch=CurrentBest; BestNum=0 (comment: a longer match is found; update BestMatch and set the number of best matches to 0).

If CurrentBest=BestMatch, then ++BestNum (comment: the number of exact matches with length equal to BestLength is incremented; this happens after the previous condition).

If BestMatch<2, then FeatureValue=0 (comment: if a match with length 2 or more is not found, the feature value is equal to 0).

| Attribute | Mandatory | Meaning |
| --- | --- | --- |
| pid | required | Property id of stream to calculate feature for. That stream has extractoccurrence = 1 in BM25 feature section. |
| default | required | Default value. Used if no occurrence information is available |
| maxMinSpan | required | Cutoff for length of span being considered. Ignored if isExact equals 1. |
| isExact | optional | Can be 1 or 0: if 0, the feature computes span score based on presence of query terms within a span, in any order; if 1, the feature requires terms to be present in the span in exactly the same order as in query. |
| isDiscounted | optional | Can be 1 or 0: if 0, the feature returns the highest score of a span in a stream; if 1, the feature also computes the number of spans that have same best score and divides that number by the number of instances of rarest query term in the stream to get BestRatio. Final feature value is equal to the highest score of a span, multiplied by BestRatio. |

| Child Element | Cardinality | Meaning |
| --- | --- | --- |
| Transform | 1 | Type and parameters of transform function. |
| Normalize | 1 | Normalization constants pre-computed at training time |
| Layer1Weights | 1 | Vector of 1st layer weights for this feature. |

If isDiscounted=0, then FeatureValue=BestMatch/NumberOfQueryTerms

The rarest query term that is present in the stream is identified, where the rarest term is the term that has the least number of instances in the stream, but still has at least one instance. The iRarestTermCount will be greater than 0, because it was identified that there are query terms in the stream, in step 2 above.

Compute the ratio of BestNum/iRarestTermCount:

if (fBestRatio>1)fBestRatio=1;

FeatureValue=fBestRatio*BestMatch/NumberOfQueryTerms;

In other words, when a single term query is issued, FeatureValue is equal to a pre-tuned default value. This helps to balance weights of the neural network ranking model that is used to rank results for both single and multiple term queries. If this is not done and the default is selected without a regard to neural network, it shifts the values on NN nodes and the quality of the results decreases. However, this is not a requirement, since there can be a benefit of having different ranking models for single and multiple term queries.

Optionally, the StreamLength element can be employed, which is a static feature based on the length of stream.

| Attribute | Mandatory | Meaning |
| --- | --- | --- |
| pid | required | Managed property id, defining static storage where raw feature value is taken from. |
| default | required | Used when we failed to get access to static feature storage |
| k | required | Used by transform |

| Child Element | Cardinality | Meaning |
| --- | --- | --- |
| Normalize | 1 | Normalization constants pre-computed at training time. |
| Layer1Weights | 1 | Vector of weights. |

$X$=StreamLength/AVDL if $(X>3)X=2.0f/(X+1.00)$;

if $(X>1)X=0.5f+(3.0f-X)/4.0f$;

where AVDL is the average length of stream across all known documents.

The formula for calculating the hidden node additions is the following:

$$HNAdd(x) = \frac{(\text{Transform}(x) - M)}{S} \cdot W$$

where, M and S are the mean and standard deviation, respectively, specified in the Normalize element, and W is the weight vector specified in the Layer1 Weights element.

The TAUC (title, anchor text, URL, and clicks) element, a child element of the RankingFeatures element, includes the following attributes.

| Attribute | Mandatory | Meaning |
| --- | --- | --- |
| pid | required | Property id of stream to calculate feature for. That stream must have extractoccurrence = 1 in BM25 feature section. |
| default | required | This will be value of X if we fail to get data from index |
| count | required | Feature will be calculated for all pids in [pid, pid+count). Lowest possible X will be selected and passed to transform function. |
| weightins | required | Cost of insertion. |
| weightdel | required | Cost of deletion of a term from stream that is not equal to any query term. |

| Child Element | Cardinality | Meaning |
| --- | --- | --- |
| Transform | 1 | Type and parameters of transform function. |
| Normalize | 1 | Normalization constants pre-computed at training time |
| Layer1Weights | 1 | Vector of 1st layer weights for this feature. |

The TAUC element feature calculates the "cost" to make the query equal to the stream. The following operations are available:

1) Insert a query term into query: cost=weightins (1 may be used instead).

2) Delete a query term from stream: cost=1.

3) Delete non-query term from stream: cost=weightdel.

X is the lowest achievable cost value.

The formula for calculating the hidden node additions is the following:

$$HNAdd(x) = \frac{(\text{Transform}(x) - M)}{S} \cdot W$$

where, Transform is the transform function specified in Transform element, M and S are the mean and standard deviation, respectively, specified in Normalize element, and W is the weight vector specified in Layer1 Weights element.

The Thresholds element is a child element to the HiddenNodes element. It is a threshold vector, where the first child is for an item with index 0, second child is for an item with index 1, etc.

| Child Element | Cardinality | Meaning |
| --- | --- | --- |
| Threshold | HiddenNodes/@count | Threshold for each hidden node. |

The Layer2Weights element is a child element to the HiddenNodes element. It is a weight vector, where the first child is for an item with index 0, second child is for an item with index 1, etc.

| Child Element | Cardinality | Meaning |
| --- | --- | --- |
| Weight | HiddenNodes/@count | Weight of each hidden node. |

The HiddenNodesAdds element is a child element to the Bucket element. It is an additions vector, where the first child is for an item with index 0, second child is for an item with index 1, etc.

| Child Element | Cardinality | Meaning |
| --- | --- | --- |
| Add | HiddenNodes/@count | Addition for each hidden node. |

The Normalize element includes normalization constants, and has the following attributes.

| Attribute | Mandatory | Meaning |
| --- | --- | --- |
| sdev | optional default = 1.0 | Standard deviation of transformed feature value pre-computed at training time. |
| mean | optional default = 0.0 | Mean of transformed feature value pre-computed at training time. |

The Transform element applies the transform function to the raw feature value, and has the following attributes.

| Attribute | Mandatory | Meaning |
| --- | --- | --- |
| type | required | InvRational, Rational, or Linear |
| k | optional | required for InvRational and Rational |
| a | optional | required for Linear |
| b | optional | required for Linear |
| maxx | optional | required for Linear |

The formulas for supported transforms are the following:

$$InvRational(x) = \frac{1}{1 + k \cdot x}$$

$$Rational\,(x) = \frac{x}{k + x}$$

$$Linear\,(x) = a \cdot \min(x, maxx) + b$$

and $$Logarithmic\,(x) = \log(\min(x, maxx) + b)$$

for QLogClicks and QLogSkips static features, and this is the natural logarithm.

The PrecomputeForRange element is a child element of the Static element, and includes optimization parameters. Hidden nodes additions get pre-computed in memory to minimize CPU (central processing unit) operations for most often raw feature values (within specified boundaries), and does not affect the rank

| Attribute | Mandatory | Meaning |
| --- | --- | --- |
| from | required | left inclusive boundary |
| to | required | right exclusive boundary |

Following is an example of a relevance model XML schema in accordance with the disclosed architecture:

```
<?xml version="1.0"?>
<xs:schema targetNamespace="urn: Company.Search.Ranking.Model.
2NN"
xmlns:rm="urn:Company.Search.Ranking.Model.2NN"
xmlns:xs="http://www.w3.org/2001/XMLSchema"
attributeFormDefault="unqualified" elementFormDefault="qualified">
    <xs:simpleType name="GUIDType">
        <xs:restriction base="xs:string">
            <xs:pattern value="[A-Fa-f0-9]{8}-([A-Fa-f0-9]{4}-){3}[A-Fa-f0-9]{12}"/>
        </xs:restriction>
    </xs:simpleType>
    <xs:simpleType name="pidType">
        <xs:restriction base="xs:unsignedInt">
            <xs:minInclusive value="1"/>
        </xs:restriction>
    </xs:simpleType>
    <xs:simpleType name="HiddenNodesCountType">
        <xs:restriction base="xs:unsignedInt">
            <xs:minInclusive value="1"/>
            <xs:maxInclusive value="8"/>
        </xs:restriction>
    </xs:simpleType>
    <xs:simpleType name="KType">
        <xs:restriction base="xs:float">
            <xs:minExclusive value="0" />
        </xs:restriction>
    </xs:simpleType>
    <xs:simpleType name="TransformTypeType">
        <xs:restriction base = "xs:string">
            <xs:enumeration value = "Rational"/>
            <xs:enumeration value = "InvRational"/>
            <xs:enumeration value = "Linear"/>
            <xs:enumeration value = "Logarithmic"/>
        </xs:restriction>
    </xs:simpleType>
    <xs:complexType name="TransformType">
        <xs:attribute name="type" type="rm:TransformTypeType" />
        <xs:attribute name="k" type="rm:KType" />
        <xs:attribute name="a" type="xs:float" />
        <xs:attribute name="b" type="xs:float" />
        <xs:attribute name="maxx" type="xs:unsignedInt" />
    </xs:complexType>
    <xs:complexType name="PrecomputeForRangeType">
        <xs:attribute name="from" type="xs:unsignedInt" />
        <xs:attribute name="to" type="xs:unsignedInt" />
    </xs:complexType>
    <xs:complexType name="NormalizeType">
        <xs:attribute name="SDev" type="xs:float" />
        <xs:attribute name="Mean" type="xs:float" />
    </xs:complexType>
    <xs:complexType name="WeightsType">
        <xs:sequence>
            <xs:element name="Weight" minOccurs="1" maxOccurs="8" type="xs:float" />
        </xs:sequence>
    </xs:complexType>
    <xs:complexType name="ThresholdsType">
        <xs:sequence>
            <xs:element name="Threshold" minOccurs="1" maxOccurs="8" type="xs:float" />
        </xs:sequence>
    </xs:complexType>
    <xs:complexType name="AddsType">
        <xs:sequence>
            <xs:element name="Add" minOccurs="1" maxOccurs="8" type="xs:float" />
        </xs:sequence>
    </xs:complexType>
    <xs:complexType name="BucketType" >
        <xs:sequence>
            <xs:element name="HiddenNodesAdds" type="rm:AddsType" />
        </xs:sequence>
        <xs:attribute name="name" type="xs:string" use="optional" />
        <xs:attribute name="value" type="xs:unsignedInt" use="required" />
    </xs:complexType>
    <xs:complexType name="MinSpanType">
        <xs:all>
            <xs:element name="Transform" type="rm:TransformType" />
            <xs:element name="Normalize" type="rm:NormalizeType"
```

-continued
```
        minOccurs="0" />
        <xs:element name="Layer1Weights" type="rm:WeightsType" />
    </xs:all>
    <xs:attribute name="name" type="xs:string" use="optional" />
    <xs:attribute name="pid" type="rm:pidType" use="required" />
    <xs:attribute name="default" type="xs:float" use="required" />
    <xs:attribute name="maxMinSpan" type="xs:unsignedInt"
use="required" />
    <xs:attribute name="isExact" type="xs:boolean" use="optional" />
    <xs:attribute name="isDiscounted" type="xs:boolean"
use="optional" />
</xs:complexType>
<xs:complexType name="StreamLengthType">
    <xs:all>
        <xs:element name="Normalize" type="rm:NormalizeType"
minOccurs="0" />
        <xs:element name="Layer1Weights" type="rm:WeightsType" />
    </xs:all>
    <xs:attribute name="name" type="xs:string" use="optional" />
    <xs:attribute name="pid" type="rm:pidType" use="required" />
    <xs:attribute name="default" type="xs:unsignedInt" use="required"
/>
    <xs:attribute name="k" type="xs:float" use="required" />
</xs:complexType>
<xs:complexType name="StaticType">
    <xs:all>
        <xs:element name="Transform" type="rm:TransformType" />
        <xs:element name="Normalize" type="rm:NormalizeType"
minOccurs="0" />
        <xs:element name="Layer1Weights" type="rm:WeightsType" />
        <xs:element name="PrecomputeForRange"
type="rm:PrecomputeForRangeType" minOccurs="0" />
    </xs:all>
    <xs:attribute name="name" type="xs:string" use="optional" />
    <xs:attribute name="pid" type="rm:pidType" use="required" />
    <xs:attribute name="default" type="xs:unsignedInt" use="required"
/>
</xs:complexType>
<xs:complexType name="TAUCType">
    <xs:all>
        <xs:element name="Transform" type="rm:TransformType" />
        <xs:element name="Normalize" type="rm:NormalizeType"
minOccurs="0" />
        <xs:element name="Layer1Weights" type="rm:WeightsType" />
    </xs:all>
    <xs:attribute name="name" type="xs:string" use="optional" />
    <xs:attribute name="pid" type="rm:pidType" use="required" />
    <xs:attribute name="default" type="xs:float" use="required" />
    <xs:attribute name="count" type="xs:unsignedInt" use="required"
/>
    <xs:attribute name="weightins" type="xs:float" use="required" />
    <xs:attribute name="weightdel" type="xs:float" use="required" />
</xs:complexType>
<xs:complexType name="SocialDistanceType" >
    <xs:sequence>
        <xs:element name="Bucket" type="rm:BucketType"
minOccurs="1" maxOccurs="unbounded" />
    </xs:sequence>
    <xs:attribute name="name" type="xs:string" use="optional" />
</xs:complexType>
<xs:complexType name="BucketedStaticType" >
    <xs:sequence>
        <xs:element name="Bucket" type="rm:BucketType"
minOccurs="1" maxOccurs="unbounded" />
    </xs:sequence>
    <xs:attribute name="name" type="xs:string" use="optional" />
    <xs:attribute name="pid" type="rm:pidType" use="required" />
    <xs:attribute name="default" type="xs:unsignedInt" use="required"
/>
</xs:complexType>
<xs:complexType name="LanguageType" >
    <xs:sequence>
        <xs:element name="Bucket" type="rm:BucketType"
minOccurs="1" maxOccurs="unbounded" />
    </xs:sequence>
    <xs:attribute name="name" type="xs:string" use="optional" />
    <xs:attribute name="pid" type="rm:pidType" use="required" />
    <xs:attribute name="default" type="xs:unsignedInt" use="required"
/>
</xs:complexType>
<xs:simpleType name="BM25WType">
    <xs:restriction base="xs:float">
        <xs:minInclusive value="0" />
    </xs:restriction>
</xs:simpleType>
<xs:simpleType name="BM25BType">
    <xs:restriction base="xs:float">
        <xs:minInclusive value="0" />
    </xs:restriction>
</xs:simpleType>
<xs:complexType name="BM25PropertyType">
    <xs:attribute name="name" type="xs:string" use="optional" />
    <xs:attribute name="pid" type="rm:pidType" use="required" />
    <xs:attribute name="w" type="rm:BM25WType" use="required" />
    <xs:attribute name="b" type="rm:BM25BType" use="required" />
    <xs:attribute name="inanchor" type="xs:boolean" use="optional" />
    <xs:attribute name="extractOccurrence" type="xs:boolean"
use="optional" />
</xs:complexType>
<xs:complexType name="BM25PropertiesType">
    <xs:sequence>
        <xs:element name="Property" type="rm:BM25PropertyType"
minOccurs="1" maxOccurs="unbounded" />
    </xs:sequence>
</xs:complexType>
<xs:complexType name="BM25Type">
    <xs:all>
        <xs:element name="Normalize" type="rm:NormalizeType"
minOccurs="0" />
        <xs:element name="Layer1Weights" type="rm:WeightsType"
minOccurs="0" />
        <xs:element name="Properties" type=
"rm:BM25PropertiesType" />
    </xs:all>
    <xs:attribute name="name" type="xs:string" use="optional" />
    <xs:attribute name="k1" type="rm:KType" use="required" />
</xs:complexType>
<xs:complexType name="RankingFeaturesType">
    <xs:sequence>
        <xs:element name="BM25Main" type="rm:BM25Type" />
        <xs:choice minOccurs="0" maxOccurs="unbounded">
            <xs:element name="BucketedStatic"
type="rm:BucketedStaticType" />
            <xs:element name="Static" type="rm:StaticType" />
            <xs:element name="SocialDistance"
type="rm:SocialDistanceType" />
            <xs:element name="TAUC" type="rm:TAUCType" />
            <xs:element name="MinSpan" type="rm:MinSpanType" />
            <xs:element name="Language" type="rm:LanguageType" />
            <xs:element name="StreamLength" type=
"rm:StreamLengthType" />
        </xs:choice>
    </xs:sequence>
</xs:complexType>
<xs:complexType name="HiddenNodesType">
    <xs:all>
        <xs:element name="Thresholds" type="rm:ThresholdsType" />
        <xs:element name="Layer2Weights" type="rm:WeightsType" />
    </xs:all>
    <xs:attribute name="count" type="rm:HiddenNodesCountType"
use="required" />
</xs:complexType>
<xs:complexType name="RankingModel2NNType">
    <xs:sequence>
        <xs:element name="HiddenNodes" type=
"rm:HiddenNodesType" />
        <xs:element name="RankingFeatures"
type="rm:RankingFeaturesType" />
    </xs:sequence>
    <xs:attribute name="id" type="rm:GUIDType" use="required" />
    <xs:attribute name="maxStageWidCount" type="xs:unsignedInt"
use="optional" />
</xs:complexType>
<xs:complexType name="RankingModel2StageType">
    <xs:sequence>
        <xs:element name="RankingModel2NN"
type="rm:RankingModel2NNType" minOccurs="1" maxOccurs="2" />
        <xs:any namespace="##other" processContents="skip"
minOccurs="0" maxOccurs="unbounded" />
    </xs:sequence>
```

-continued

```
    <xs:attribute name="id" type="rm:GUIDType" use="required" />
    <xs:attribute name="name" type="xs:string" use="optional" />
    <xs:attribute name="description" type="xs:string" use="optional" />
  </xs:complexType>
  <xs:element name="RankingModel2Stage" type="rm:RankingModel2StageType" />
</xs:schema>
```

Included herein is a set of flow charts representative of exemplary methodologies for performing novel aspects of the disclosed architecture. While, for purposes of simplicity of explanation, the one or more methodologies shown herein, for example, in the form of a flow chart or flow diagram, are shown and described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

Figure 3:
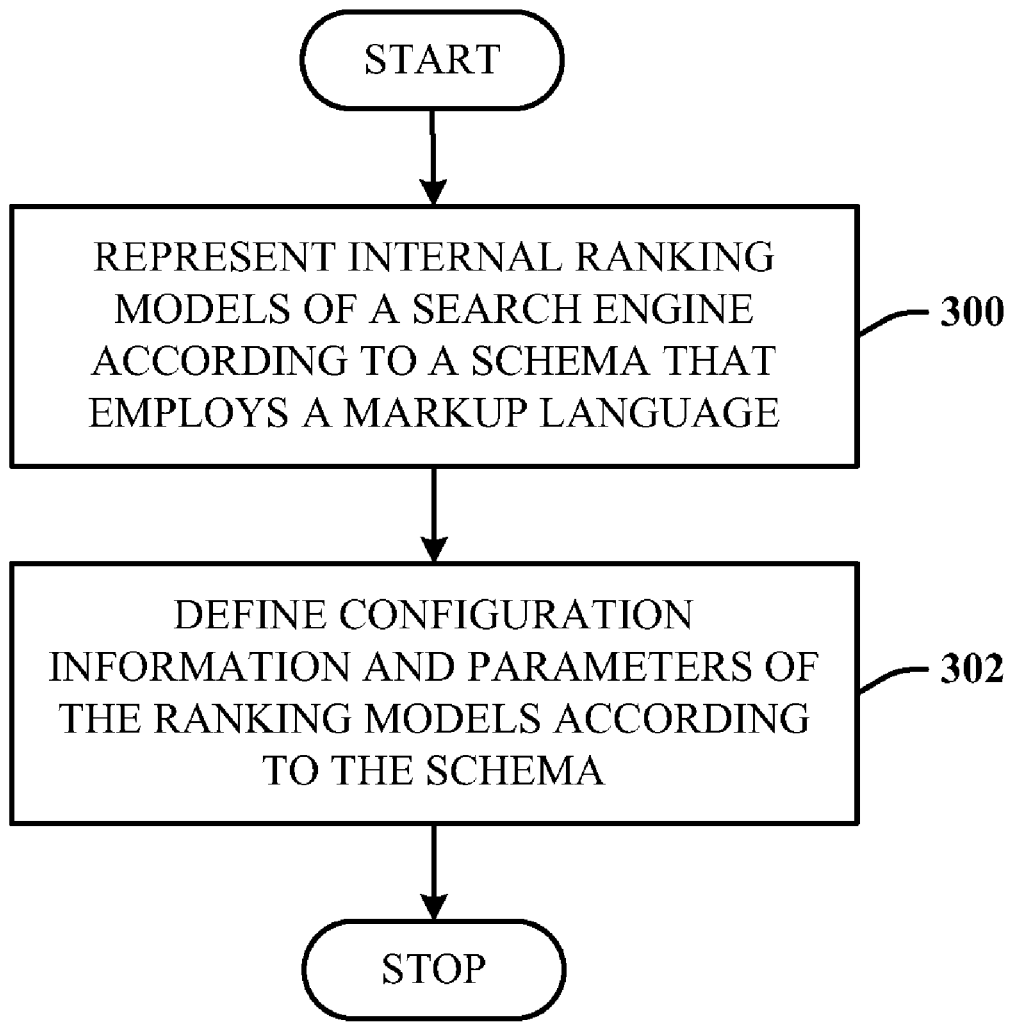
FIG. 3 illustrates a computer-implemented document ranking method.

FIG. 3 illustrates a computer-implemented document ranking method. At 300, internal ranking models of a search engine are represented according to a schema that employs a markup language. At 302, configuration information and parameters of the ranking models are defined according to the schema.

Figure 4:
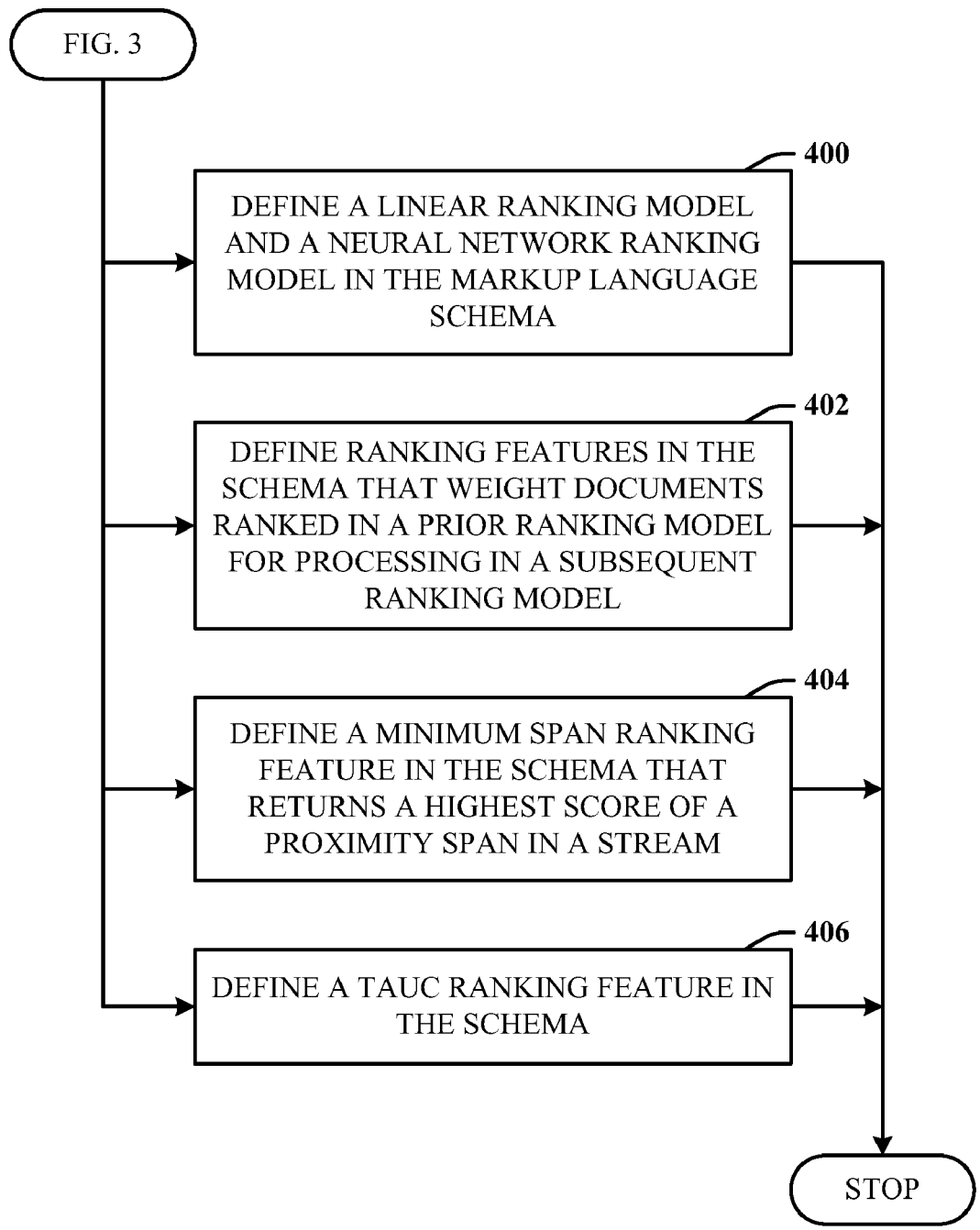
FIG. 4 illustrates additional aspects of the method of FIG. 3.

FIG. 4 illustrates additional aspects of the method of FIG. 3. At 400, a linear ranking model and a neural network ranking model are defined in the markup language schema. At 402, ranking features are defined in the schema that weight documents ranked in a prior ranking model for processing in a subsequent ranking model. At 404, a minimum span ranking feature is defined in the schema that returns a highest score of a proximity span in a stream. At 406, a TAUC (title, anchor text, URL, click) ranking feature is defined in the schema.

As used in this application, the terms "component" and "system" are intended to refer to a computer-related entity, either hardware, a combination of hardware and software, software, or software in execution. For example, a component can be, but is not limited to being, a process running on a processor, a processor, a hard disk drive, multiple storage drives (of optical, solid state, and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. The word "exemplary" may be used herein to mean serving as an example, instance, or illustration. Any aspect or design described herein as "exemplary" is not necessarily to be construed as preferred or advantageous over other aspects or designs.

Figure 5:
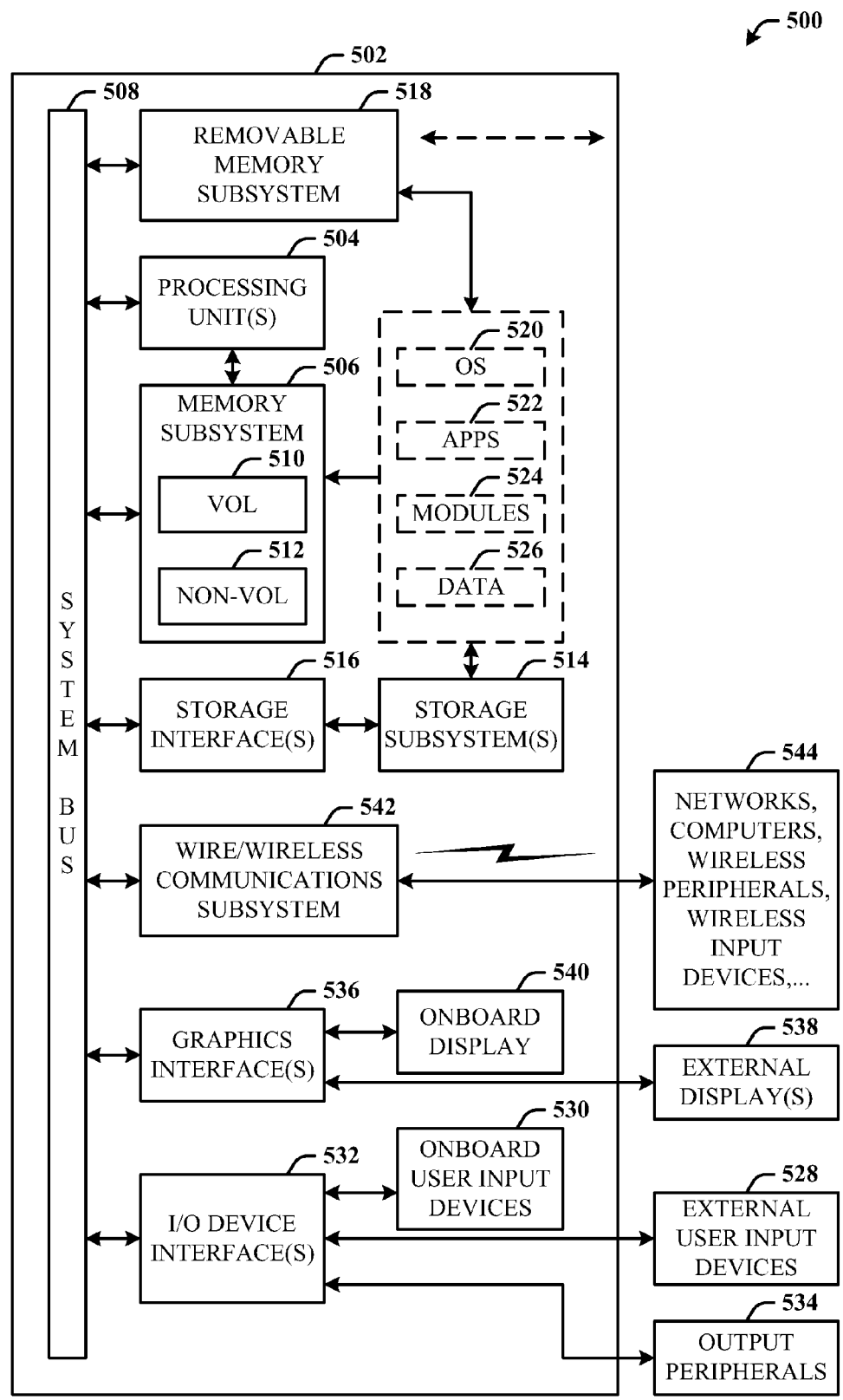
FIG. 5 illustrates a block diagram of a computing system operable to execute markup language schema definition of internal ranking models in accordance with the disclosed architecture.

Referring now to FIG. 5, there is illustrated a block diagram of a computing system 500 operable to execute markup language schema definition of internal ranking models in accordance with the disclosed architecture. In order to provide additional context for various aspects thereof, FIG. 5 and the following description are intended to provide a brief, general description of the suitable computing system 500 in which the various aspects can be implemented. While the description above is in the general context of computer-executable instructions that can run on one or more computers, those skilled in the art will recognize that a novel embodiment also can be implemented in combination with other program modules and/or as a combination of hardware and software.

The computing system 500 for implementing various aspects includes the computer 502 having processing unit(s) 504, a computer-readable storage such as a system memory 506, and a system bus 508. The processing unit(s) 504 can be any of various commercially available processors such as single-processor, multi-processor, single-core units and multi-core units. Moreover, those skilled in the art will appreciate that the novel methods can be practiced with other computer system configurations, including minicomputers, mainframe computers, as well as personal computers (e.g., desktop, laptop, etc.), hand-held computing devices, microprocessor-based or programmable consumer electronics, and the like, each of which can be operatively coupled to one or more associated devices.

The system memory 506 can include computer-readable storage such as a volatile (VOL) memory 510 (e.g., random access memory (RAM)) and non-volatile memory (NON-VOL) 512 (e.g., ROM, EPROM, EEPROM, etc.). A basic input/output system (BIOS) can be stored in the non-volatile memory 512, and includes the basic routines that facilitate the communication of data and signals between components within the computer 502, such as during startup. The volatile memory 510 can also include a high-speed RAM such as static RAM for caching data.

The system bus 508 provides an interface for system components including, but not limited to, the system memory 506 to the processing unit(s) 504. The system bus 508 can be any of several types of bus structure that can further interconnect to a memory bus (with or without a memory controller), and a peripheral bus (e.g., PCI, PCIe, AGP, LPC, etc.), using any of a variety of commercially available bus architectures.

The computer 502 further includes machine readable storage subsystem(s) 514 and storage interface(s) 516 for interfacing the storage subsystem(s) 514 to the system bus 508 and other desired computer components. The storage subsystem(s) 514 can include one or more of a hard disk drive (HDD), a magnetic floppy disk drive (FDD), and/or optical disk storage drive (e.g., a CD-ROM drive DVD drive), for example. The storage interface(s) 516 can include interface technologies such as EIDE, ATA, SATA, and IEEE 1394, for example.

One or more programs and data can be stored in the memory subsystem 506, a machine readable and removable memory subsystem 518 (e.g., flash drive form factor technology), and/or the storage subsystem(s) 514 (e.g., optical, magnetic, solid state), including an operating system 520, one or more application programs 522, other program modules 524, and program data 526.

Generally, programs include routines, methods, data structures, other software components, etc., that perform particular tasks or implement particular abstract data types. All or portions of the operating system 520, applications 522, modules 524, and/or data 526 can also be cached in memory such as the volatile memory 510, for example. It is to be appreciated that the disclosed architecture can be implemented with various commercially available operating systems or combinations of operating systems (e.g., as virtual machines).

The storage subsystem(s) 514 and memory subsystems (506 and 518) serve as computer readable media for volatile and non-volatile storage of data, data structures, computer-executable instructions, and so forth. Computer readable media can be any available media that can be accessed by the computer 502 and includes volatile and non-volatile internal and/or external media that is removable or non-removable. For the computer 502, the media accommodate the storage of data in any suitable digital format. It should be appreciated by those skilled in the art that other types of computer readable media can be employed such as zip drives, magnetic tape, flash memory cards, flash drives, cartridges, and the like, for storing computer executable instructions for performing the novel methods of the disclosed architecture.

A user can interact with the computer 502, programs, and data using external user input devices 528 such as a keyboard and a mouse. Other external user input devices 528 can include a microphone, an IR (infrared) remote control, a joystick, a game pad, camera recognition systems, a stylus pen, touch screen, gesture systems (e.g., eye movement, head movement, etc.), and/or the like. The user can interact with the computer 502, programs, and data using onboard user input devices 530 such a touchpad, microphone, keyboard, etc., where the computer 502 is a portable computer, for example. These and other input devices are connected to the processing unit(s) 504 through input/output (I/O) device interface(s) 532 via the system bus 508, but can be connected by other interfaces such as a parallel port, IEEE 1394 serial port, a game port, a USB port, an IR interface, etc. The I/O device interface(s) 532 also facilitate the use of output peripherals 534 such as printers, audio devices, camera devices, and so on, such as a sound card and/or onboard audio processing capability.

One or more graphics interface(s) 536 (also commonly referred to as a graphics processing unit (GPU)) provide graphics and video signals between the computer 502 and external display(s) 538 (e.g., LCD, plasma) and/or onboard displays 540 (e.g., for portable computer). The graphics interface(s) 536 can also be manufactured as part of the computer system board.

The computer 502 can operate in a networked environment (e.g., IP-based) using logical connections via a wired/wireless communications subsystem 542 to one or more networks and/or other computers. The other computers can include workstations, servers, routers, personal computers, microprocessor-based entertainment appliances, peer devices or other common network nodes, and typically include many or all of the elements described relative to the computer 502. The logical connections can include wired/wireless connectivity to a local area network (LAN), a wide area network (WAN), hotspot, and so on. LAN and WAN networking environments are commonplace in offices and companies and facilitate enterprise-wide computer networks, such as intranets, all of which may connect to a global communications network such as the Internet.

When used in a networking environment the computer 502 connects to the network via a wired/wireless communication subsystem 542 (e.g., a network interface adapter, onboard transceiver subsystem, etc.) to communicate with wired/wireless networks, wired/wireless printers, wired/wireless input devices 544, and so on. The computer 502 can include a modem or other means for establishing communications over the network. In a networked environment, programs and data relative to the computer 502 can be stored in the remote memory/storage device, as is associated with a distributed system. It will be appreciated that the network connections shown are exemplary and other means of establishing a communications link between the computers can be used.

The computer 502 is operable to communicate with wired/wireless devices or entities using the radio technologies such as the IEEE 802.xx family of standards, such as wireless devices operatively disposed in wireless communication (e.g., IEEE 802.11 over-the-air modulation techniques) with, for example, a printer, scanner, desktop and/or portable computer, personal digital assistant (PDA), communications satellite, any piece of equipment or location associated with a wirelessly detectable tag (e.g., a kiosk, news stand, restroom), and telephone. This includes at least Wi-Fi (or Wireless Fidelity) for hotspots, WiMax, and Bluetooth™ wireless technologies. Thus, the communications can be a predefined structure as with a conventional network or simply an ad hoc communication between at least two devices. Wi-Fi networks use radio technologies called IEEE 802.11x (a, b, g, etc.) to provide secure, reliable, fast wireless connectivity. A Wi-Fi network can be used to connect computers to each other, to the Internet, and to wire networks (which use IEEE 802.3-related media and functions).

The illustrated aspects can also be practiced in distributed computing environments where certain tasks are performed by remote processing devices that are linked through a communications network. In a distributed computing environment, program modules can be located in local and/or remote storage and/or memory system.

Figure 6:
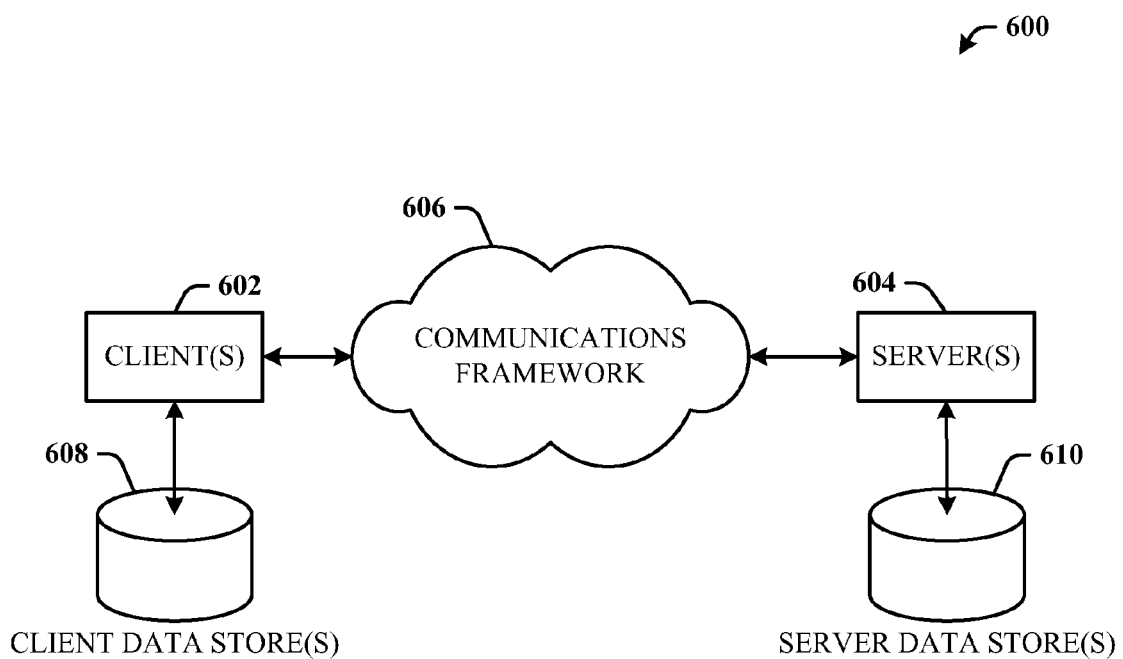
FIG. 6 illustrates a schematic block diagram of a computing environment that executes markup language schema definition of internal ranking models.

Referring now to FIG. 6, there is illustrated a schematic block diagram of a computing environment 600 that executes markup language schema definition of internal ranking models. The environment 600 includes one or more client(s) 602. The client(s) 602 can be hardware and/or software (e.g., threads, processes, computing devices). The client(s) 602 can house cookie(s) and/or associated contextual information, for example.

The environment 600 also includes one or more server(s) 604. The server(s) 604 can also be hardware and/or software (e.g., threads, processes, computing devices). The servers 604 can house threads to perform transformations by employing the architecture, for example. One possible communication between a client 602 and a server 604 can be in the form of a data packet adapted to be transmitted between two or more computer processes. The data packet may include a cookie and/or associated contextual information, for example. The environment 600 includes a communication framework 606 (e.g., a global communication network such as the Internet) that can be employed to facilitate communications between the client(s) 602 and the server(s) 604.

Communications can be facilitated via a wire (including optical fiber) and/or wireless technology. The client(s) 602 are operatively connected to one or more client data store(s) 608 that can be employed to store information local to the client(s) 602 (e.g., cookie(s) and/or associated contextual information). Similarly, the server(s) 604 are operatively connected to one or more server data store(s) 610 that can be employed to store information local to the servers 604.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A computer-implemented document ranking system, comprising:
   at least one ranking model associated with a search engine
      for ranking search documents generated in response to a query on a search engine in multiple stages, wherein the at least one ranking model comprises:
- a linear ranking model for performing a first document ranking and producing a set of candidate documents ranked according to predefined ranking criteria imposed in the linear ranking model;
- a neural network ranking model for re-ranking the set of ranked candidate documents produced by the linear ranking model according to predefined ranking criteria imposed in the neural network ranking model including hidden nodes, ranking features, and weighting; and
- a schema component that represents the ranking models in a predefined markup language.

2. The system of claim 1, wherein the markup language is extensible markup language (XML).

3. The system of claim 1, wherein the ranking models are internal.

4. The system of claim 1, wherein the ranking models include a neural network of multiple layers.

5. The system of claim 1, wherein a document ranked in a first ranking model is boosted in rank for re-ranking with documents of a second ranking model.

6. The system of claim 1, wherein a set of highest ranking documents of a first model are used in re-ranking documents of a second model.

7. The system of claim 1, wherein a ranking model includes ranking features that have parameters related to at least one of query dependent rank, static feature with small enumerable values, query independent rank, query language matching, proximity minimal span, stream length, TAUC (title, anchor text, URL, clicks), or social distance.

8. A computer-implemented document ranking system, comprising:
- at least one ranking model associated with a search engine for ranking search documents generated in response to a query on a search engine in multiple stages, wherein the at least one ranking model comprises:
  - a linear ranking model for performing a first document ranking and producing a set of candidate documents ranked according to predefined ranking criteria imposed in the linear ranking model;
  - a neural network ranking model for receiving additional ranking features from the set of ranked candidate documents produced by the linear ranking model and re-computing a ranking score for the set of ranked candidate documents according to predefined ranking criteria imposed in the neural network ranking model wherein the ranking criteria includes:
    - a ranking features element for boosting a ranking weight of candidate documents according to parameters related to at least one from a set of: a query dependent rank, a static feature with small enumerable values, a query independent rank, a query language matching, a proximity minimal span, a stream length, a TAUC (title, anchor text, URL, clicks), and a social distance; and
    - a language element as a child of the ranking feature element, including a locale identifier representing a language, a region, and a sort combination that is associated with a date, a time, a number, a currency and formatting, calendar preferences, input methods, and sorting preferences of the set of candidate documents; and
- a schema component that represents the ranking models in an XML schema.

9. The system of claim 8, wherein the ranking models are internal.

10. The system of claim 8, wherein the neural network ranking model includes of two layers.

11. The system of claim 8, wherein when the search includes a single term query, a feature value defaults to a pre-turned default value to balance weights of a neural network ranking model.

12. The system of claim 8, wherein a set of documents ranked in a first model is re-ranked with documents in a second model to output a final set of ranked documents.

13. The system of claim 8, wherein the XML schema defines hidden nodes and weighting for a neural network-based ranking model.

14. A computer-implemented document ranking method, comprising:
- identifying one or more search documents generated in response to a query on a search engine;
- passing the one or more search documents to a ranking model internal to the search engine for ranking the one or more search documents in multiple stages, wherein passing the search documents to the internal ranking model for ranking the search documents in multiple stages further comprises:
  - passing the one or more documents to a linear ranking model for a first document ranking;
  - generating a set of candidate documents ranked according to according to ranking criteria imposed in the linear ranking model;
  - passing the set of candidate documents generated as output from the linear ranking model to a neural network ranking model; and
  - re-ranking the set of candidate documents from the linear ranking model at the neural network ranking model;
- employing a schema for representing the internal ranking model in a markup language; and
- defining configuration information and parameters of the internal ranking models according to the schema.

15. The method of claim 14, wherein the markup language of the schema is XML.

16. The method of claim 14, further comprising defining the linear ranking model and the neural network ranking model in the markup language schema.

17. The method of claim 14, further comprising defining ranking features in the schema that weight documents ranked in a prior ranking model for processing in a subsequent ranking model.

18. The method of claim 14, further comprising defining a minimum span ranking feature in the schema that returns a highest score of a proximity span in a stream.

19. The method of claim 14, further comprising defining a TAUC (title, anchor text, URL, click) ranking feature in the schema.

* * * * *